No. 641,756.                                                                 Patented Jan. 23, 1900.
R. BACH.
HANDSAW.
(Application filed July 22, 1899.)

(No Model.)

Witnesses:
Prescott D. Yates
E. Behel

Inventor:
Robert Bach
By A.O. Behel
Atty.

UNITED STATES PATENT OFFICE.

ROBERT BACH, OF ROCKFORD, ILLINOIS, ASSIGNOR OF ONE-HALF TO JOSEPH E. BROADIE, HANS PETERSEN, PETER PETERSEN, AND FREDERICK LARSEN, OF SAME PLACE.

HANDSAW.

SPECIFICATION forming part of Letters Patent No. 641,756, dated January 23, 1900.

Application filed July 22, 1899. Serial No. 724,764. (No model.)

*To all whom it may concern:*

Be it known that I, ROBERT BACH, a citizen of the United States, residing at Rockford, in the county of Winnebago and State of Illinois, have invented certain new and useful Improvements in Handsaws, of which the following is a specification.

The object of this invention is to construct a handsaw to both faces of which are pivoted angle-bars having their free ends connected and movable together and a segmental slot limiting the movement of the bars.

The further object of this invention is to graduate the back edge of the saw into inches and fractions thereof.

Figure 1:
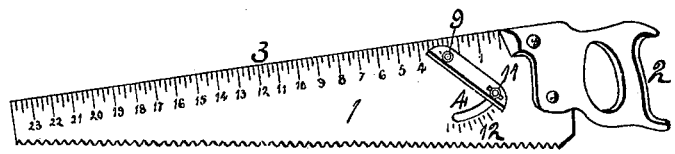
Figure 2:
Figure 3:
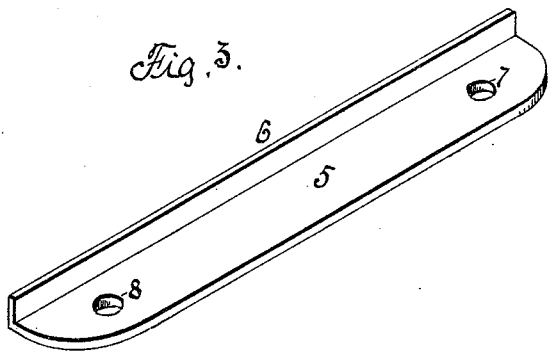

In the accompanying drawings, Figure 1 is a face representation of a saw embodying my improvements. Fig. 2 is a top view of the saw. Fig. 3 is an isometrical representation of one of the angle-bars.

The saw consists of the blade 1 and handle 2. The back edge of the blade is provided with graduations 3 and divided into inches and fractions thereof. A segmental slot 4 is formed through the blade. Upon each side of the blade 1 is located a bar 5, having an upturned edge 6 extending throughout its length and two perforations 7 and 8, one at each end of said bars. These angle-bars are pivotally connected with the saw-blade by a screw-bolt 9, passing through the parts and receiving a thumb-nut 10 on its projecting end. The free ends of the angle-bars are connected by a bolt passing through the parts and through the segmental slot 4, receiving thumb-nuts 11 on the ends. This slot is provided with graduations 12.

By means of the angle-bars the back of the saw may be used as a straight-edge. The bars can be adjusted from a right angle to a miter, the ends of the slot 12 forming stops for these two positions, and by loosening either of the thumb-nuts 11 both bars are adjusted in unison, and in the single article I combine a saw-rule and adjustable bevel.

By providing each of the bars 5 with an upturned edge 6, which extends throughout the entire length of the same, said bars are greatly strengthened or stiffened, and at the same time a comparatively broad surface is provided by the upturned edges 6 for contact with the timber when the saw is being used as a straight-edge rule or bevel, and, furthermore, by this construction I am enabled to form the bars from comparatively thin metal.

With the construction herein set forth, wherein the angle-bars 5 are connected to the saw by bolts passing through openings in the extreme opposite ends of the bars, it will be evident that said bars will be firmly supported at such ends and will not therefore be likely to become bent out of shape by coming into contact with the timber during the act of sawing, which bending of the bars would obviously destroy the usefulness of the tool.

I am aware that heretofore and prior to my invention beams or bars have been pivoted to a saw-blade for a purpose similar to the present invention; but in all such cases, so far as I am aware, one of the pivotal points for such beams or bars was located at a point intermediate the ends thereof, so that one end of the bar or bars was left free and unsupported, and in use would soon become bent out of a straight line, thus immediately destroying the usefulness of the beams or bars for the purpose intended. My invention differs from such prior devices in that the bars are pivoted at their extreme opposite ends and are thus firmly supported at such ends, so as not to be materially affected if subjected to shocks or blows during the sawing operation.

I claim as my invention—

A handsaw having a segmental slot in the blade thereof near the handle, combined with two bars provided with perforations in the opposite end portions thereof, each bar having an upturned edge or flange extending throughout its entire length, one of said bars being located on each side of the saw-blade and both pivoted thereto at one end by a single bolt passed through the perforations in such ends of the bars and through the saw-blade, and the opposite ends of said bars being connected to move in unison by a bolt passed through the perforations in said ends, said latter-named bolt being freely movable within the segmental slot in the saw-blade, and thumb-screws upon the bolt for locking the bars in different positions of adjustment on the saw-blade, the construction being such that the extreme opposite end portions of the bars are supported by the bolts passing therethrough, substantially as described.

ROBERT BACH.

Witnesses:
A. O. BEHEL,
E. BEHEL.